(12) United States Patent
Ostwald et al.

(10) Patent No.: US 6,570,734 B2
(45) Date of Patent: May 27, 2003

(54) AUTOMATED STORAGE LIBRARY WITH MULTIPLE INDEPENDENT ROBOTS

(75) Inventors: Timothy C. Ostwald, Louisville, CO (US); Daniel James Plutt, Superior, CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 09/875,745

(22) Filed: Jun. 7, 2001

(65) Prior Publication Data

US 2002/0027742 A1 Mar. 7, 2002

Related U.S. Application Data

(63) Continuation of application No. 09/108,612, filed on Jul. 1, 1998, now Pat. No. 6,268,863.

(51) Int. Cl.[7] .............................................. G11B 15/08
(52) U.S. Cl. ...................................... 360/92; 369/30.39
(58) Field of Search .............................. 360/92, 98.04, 360/98.06; 369/30.06, 30.39, 30.69, 30.34, 191, 192, 231, 233, 258, 261, 178.01, 35.01–39.01

(56) References Cited

U.S. PATENT DOCUMENTS

| | | | |
|---|---|---|---|
| 4,907,889 A | 3/1990 | Simone | |
| 4,937,690 A | 6/1990 | Yamashita et al. | |
| 5,143,193 A | 9/1992 | Geraci | |
| 5,206,845 A | * 4/1993 | Baxter | ...................... 360/98.06 |
| 5,395,199 A | 3/1995 | Day et al. | |
| 5,456,569 A | 10/1995 | Cheatham et al. | |
| 5,914,919 A | 6/1999 | Fosler et al. | |
| 5,925,119 A | 7/1999 | Maroney | |
| 5,940,356 A | * 8/1999 | Toumbas | ...................... 360/92 |
| 6,175,539 B1 | 1/2001 | Holmquist et al. | |
| 6,222,699 B1 | 4/2001 | Luffel et al. | |

* cited by examiner

Primary Examiner—A. Heinz
(74) Attorney, Agent, or Firm—Wayne P. Bailey

(57) ABSTRACT

The automated library system contains multiple independent robots for concurrently manipulating multiple media cartridges. The library system comprises a two-dimensional array that contains media cartridge storage cells and media cartridge players. A system of rails is used to guide robotic pods through all of the locations in the array, which eliminates the need for any steering or guide mechanism on board the robotic pods, resulting in a reduction in the mass of the robotic pods. The rail system also constrains the movement of the robotic pods into horizontal and vertical movements, thereby simplifying the control algorithms for collision avoidance that are required by a typical random moveable object handling system based on horizontal, vertical and diagonal degrees of freedom. The robotic pods contain a moveable carriage that is capable of transporting robotic components, such as media cartridge pickers, bar code reading devices, and other task oriented sub-modules, in the storage library rail system.

91 Claims, 10 Drawing Sheets

US 6,570,734 B2

AUTOMATED STORAGE LIBRARY WITH MULTIPLE INDEPENDENT ROBOTS

This is a continuation of application Ser. No. 09/108,612 filed on Jul. 1, 1998 U.S. Pat. No. 6,268,863.

FIELD OF THE INVENTION

This invention relates to robotic mechanisms that manipulate media cartridges in an automated media cartridge storage library subsystem, and in particular, to a fully redundant system that includes a plurality of independent robots in the form of robotic pods. The robotic pods are concurrently operational on a vertical wall of media cartridge storage cells and media cartridge players to both transport selected media cartridges among the media cartridge storage cells and media cartridge players and perform other library system tasks.

PROBLEM

It is a problem in automated media cartridge storage library subsystems to serve the media cartridge mount requests that are received from an associated host processor in a timely and efficient manner. Existing automated media cartridge storage library subsystems (library systems) are capable of storing and retrieving large quantities of information that are stored on media cartridges. This is accomplished by the use of a large number of cartridge storage cells, each of which houses a single media cartridge, that are housed within an enclosure. Such library systems utilize a robotic mechanism, such as a robotic arm, to quickly move the media cartridges between their media cartridge storage cells and media cartridge players. For example, to retrieve information that is stored on a selected media cartridge, the robotic arm is moved to a location opposite the media cartridge storage cell that houses the selected media cartridge. An end effector of the robotic arm then grasps the media cartridge and extracts it from the media cartridge storage cell. The robotic arm then repositions itself from the media cartridge storage cell to a media player, where the end effector loads the media cartridge into the media player.

The problem with this architecture is that the robotic arm must wait for the previously mounted media cartridge to be dismounted and put away. The media cartridge mount cycle requires exclusive use of the robotic arm, even though another requested mount cycle may be waiting in a queue for the robotic arm to become available. A reduction in usable duty cycle is also incurred if the robotic arm is requested to move media cartridges from a library system loading window to their assigned media cartridge storage cells or the robotic arm passes media cartridges between library enclosures.

A further problem with existing library systems is that a single robotic arm system requires expensive mechanics to maintain reliability levels common to the high duty cycle of the industry, and an inoperable robotic arm shuts down the complete system for repair. Single arm library systems, as typified in U.S. Pat. No. 5,143,193 have been improved to provide redundant robotic mechanisms in order to mitigate the effects of these problems. For example, a double end effector is disclosed in U.S. Pat. No. 4,907,889 to thereby allow a single robotic arm to simultaneously carry two media cartridges or to survive the loss on one of the end effectors. The library design of U.S. Pat. No. 5,456,569 has two independent end effectors and two vertical moveable means to provide even more redundancy. The two robot system of U.S. Pat. No. 4,937,690 shows how two complete robotic arms can overlap in a common robotic space. A method with multiple accessors is disclosed in the design of U.S. Pat. No. 5,395,199 whereby each accessor is semi-independent of the others to move multiple media cartridges at once. These designs show improved methods of incorporating multiple robotic arms and/or multiple segments of the robotic arms into a given library space.

A further problem is that library system activities are constantly interrupted by overhead tasks. The storage library contents are typically monitored with label readers incorporated on the robotic arm, and the service of the robotic arm is required in such cases where label reading is required. Also, robotic arm positioning within the robotic space is usually accomplished with an optical or other locating device that is mounted on the robotic arm, requiring that the robotic arm be used solely to calibrate the position of the end effector with respect to the media cartridges. Label reading and calibration are time consuming tasks which impact the duty cycle of a library system. Robotic arm calibration is necessary to ensure positional accuracy, and a large robotic arm may have extensive calibration devices on board the robotic arm, adding to the cost and weight of the robotic arm. The typical robotic arm and its supporting structure requires several servo motors to move the robotic arm between positions. Each move of the robotic arm requires a time interval after the mechanism has stopped to bring the servo position into a steady state. The servo mechanism settling time depends on the stiffness of the robotic arm and can represent a substantial portion of the total robotic duty cycle. Large robotic arms with poor stiffness have longer settling times than small stiff robotic arms. The moving mass of the robotic arm is much greater than the media cartridge being moved. It is common practice to reduce mass through the use of high-technology materials, although technological advances in materials do not give an adequate cost/performance solution to this problem. The moving mass of the robotic arm also relates directly to power consumption, which is an important factor in large installations. A large storage library may take up a considerable amount of floor space, primarily due to the robotic arm design. The typical design utilizes a large swept space for the robotic arm, while the media volumetric space is only a fraction of the total space occupied by the library system. The larger the robotic arm, the more volume taken as the robotic arm is moved about during operation. A large space is also used if the media cartridges are stored in a horizontal plane rather than a vertical plane. Vertically oriented storage walls of media cartridges are preferred over horizontal storage due to the fact that floor space is at a premium while room space is often available in the vertical direction. The system of U.S. Pat. No. 5,395,199 shows a horizontal storage array that covers a computer room floor, but does not make use of the rest of the space above the floor. In addition, vertical media storage planes accommodate an operator in between media cartridge storage walls during maintenance, without compromising operation of a multi-library system.

SOLUTION

The above described problems are solved and a technical advance achieved by the present automated library system that contains multiple independent robots for concurrently manipulating multiple media cartridges. The library system comprises a two-dimensional array that contains media cartridge storage cells and media cartridge players. A system of rails is used to guide robotic pods through all of the locations in the array, which eliminates the need for any steering or guide mechanism on board the robotic pods, resulting in a reduction in the mass of the robotic pods. The rail system also constrains the movement of the robotic pods into horizontal and vertical movements, thereby simplifying the control algorithms for collision avoidance that are required by a typical random moveable object handling system based on horizontal, vertical and diagonal degrees of freedom. The robotic pods contain a moveable carriage that is capable of transporting robotic components, such as media cartridge pickers, bar code reading devices, and other task oriented sub-modules, in the storage library rail system. For example, the robotic pod carriage assemblies can be fitted with maintenance devices, monitoring instruments or cleaning apparatus to give added flexibility to the rail system architecture.

The rail system is implemented with a rack and pinion type drive gear interface, rather than a rubber tire type friction drive, to thereby allow for improved traction and increased operating speeds of the robotic pods. Such a drive system can be integrated with position sensing encoders that are located on each robotic pod drive motor to provide precise locating of the robotic pod on a wall of the array. Typical robotic arms require the continuous execution of calibration algorithms to achieve the necessary positioning accuracy, using optical or mechanical devices in the process. The robotic pods do not require continuous calibration because the relationship between media cartridge storage cells and the robotic pods is made much more precise by the close proximity of the robotic pod to the wall structure and the use of the position encoders on each robotic pod. The rail system also allows for the incremental expansion of the library system by simply adding more rail, and the library system can also be simply partitioned into separate modules. Furthermore, media cartridges can be shared between libraries by adding pass through rails that interconnect the libraries.

In this library system, the moving mass and volume of a robotic pod is substantially less than a comparable robotic arm type device. The reduction in mass of the robotic mechanism allows for higher operating speeds, which results in improved performance of the library system, at lower power consumption. Typical robotic servo settling times are also reduced because of the elimination of large mechanical elements. Reduction in robotic mass further allows large library systems to be placed on lighter weight computer floors, or even in non-computer environments such as ships, light weight office structures and residential buildings.

In addition, the multiple robot architecture reduces the need for very high reliability and costly robotic mechanisms. This is because the media cartridge manipulation work that a robotic arm does in a typical library system can now be divided among multiple robotic pods. Each robotic pod performs only a fraction of the media mount operations and failure resiliency is an added benefit to the multiple redundant robot architecture. A service technician can easily retrieve a dysfunctional robotic pod from a library system enclosure without disabling the entire library system. Manufacturing of the multiple independent robots involves fewer parts and less overhead due to decreased floor space, easier testability and faster build cycles. Engineering changes at the factory and in the field involve only the individual robotic pods and rails, where an arm type robot is subject to downtime and increased repair cost because of the complexity of a large assembly. Upgrading old assemblies or adding new robotic pods to an existing library involves simply opening a service port in the library system enclosure, where robotic pods can be loaded or unloaded from the rail system. Library system performance enhancements can be realized and cost levels established by adding and subtracting robotic pods.

DETAILED DESCRIPTION OF THE INVENTION

The present system is an automated media cartridge storage library that is equipped with a plurality of robotic accessors that move about in a vertical plane to access data storage elements comprising media cartridges that are stored in a vertically oriented array of media cartridge storage cells. The robotic accessors are wireless, remotely controlled robotic picker pods that are capable of moving among the media cartridge storage cells, media cartridge players and other destinations as required in the data storage environment. In the primary embodiment, a vertical wall of media cartridge storage cells is equipped with an integral system of rails for guidance of the robotic picker pods.

Library System Architecture

Figure 1:
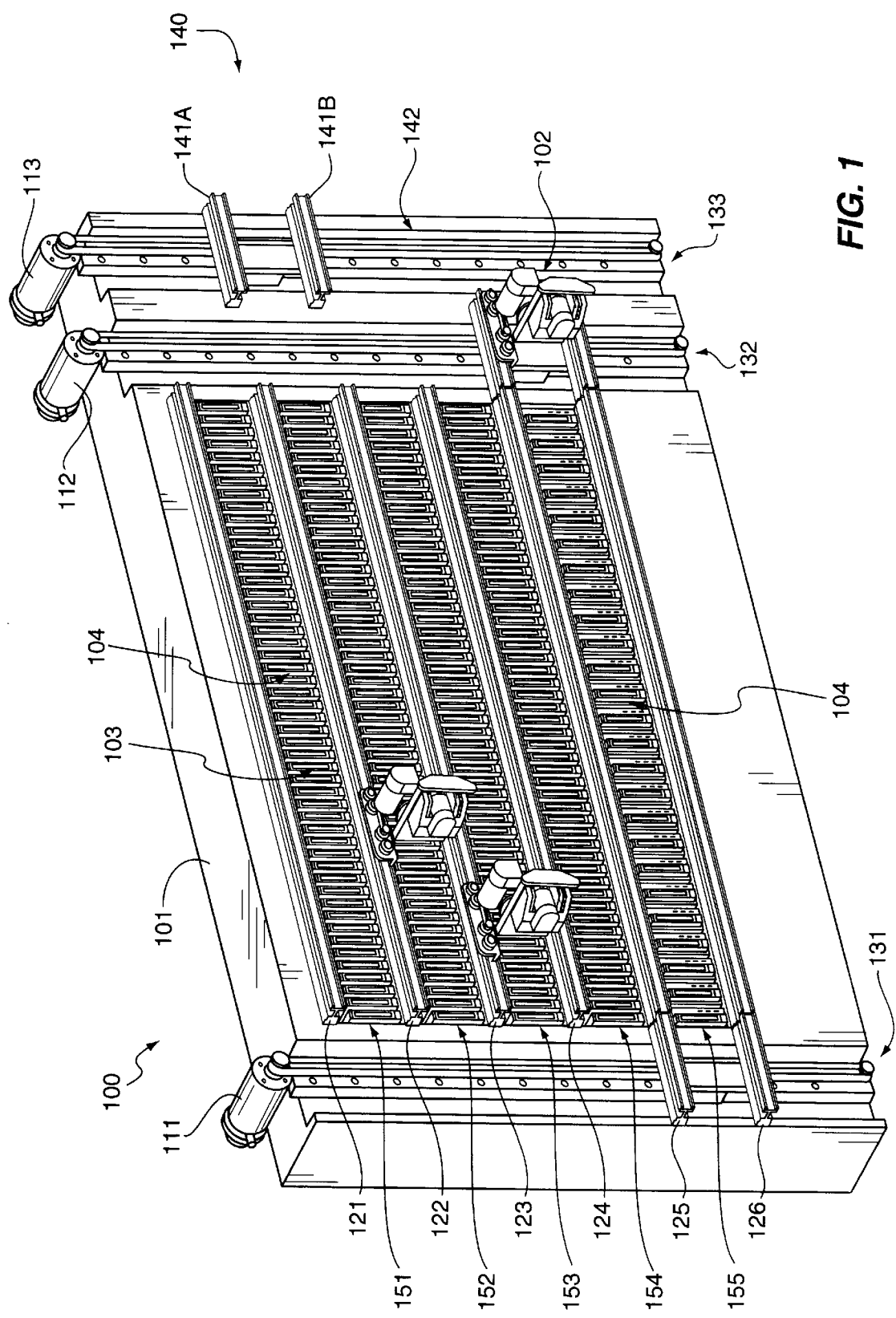
FIG. 1 shows a perspective view of one embodiment of the present apparatus for concurrently manipulating multiple media cartridges by the use of multiple robotic pod mechanisms.

The architecture of the present automated library system 100 is illustrated in FIG. 1 and contains the multiple independent robots 102 to enable the library system 100 to concurrently manipulate multiple media cartridges 105. The library system 100 comprises a two-dimensional array of media cartridge storage cells 103 and media cartridge players 104 that are mounted in a frame 101. A system of rails 121–126 is used to guide robotic pods 102 through all of the locations in the array, which eliminates the need for any steering or guide mechanisms on board the robotic pods 102, resulting in a reduction in the mass of the robotic pods 102. The rail system 121–126 also constrains the movement of the robotic pods 102 into horizontal and vertical movements, thereby simplifying the control algorithms for collision avoidance that are required by a typical random moveable object handling system based on horizontal, vertical and diagonal degrees of freedom. The robotic pods 102 contain a moveable carriage that is capable of transporting robotic components, such as media cartridge pickers, bar code reading devices, and other task oriented sub-modules, on the storage library rail system.

As shown in FIG. 1, the frame 101 is designed to receive a plurality of rows 151–154 of media cartridge storage cells 103, each of which is designed to house a single media cartridge 105. The media cartridge players 104 are shown in an arbitrary location in a horizontal row 155 at the bottom of the frame 101, although the library system 100 can incorporate media cartridge players 104 at any location in the frame 101 to optimize performance. The robotic pods 102 are attached to the frame 101 via horizontal guide rails 121–126 which serve to frame the media cartridge storage cells 103 and media cartridge players 104 on the top and bottom sides thereof. FIG. 1 shows an array of media storage cells 103 fully populated with media cartridges 105 of any arbitrary type. The robotic pod guide rails 121–126 provide support of the robotic pods 102 in the vertical direction to oppose the force of gravity, and they also provide a meshing surface of suitable design to impart traction in the horizontal direction for motive transport of the robotic pods 102. The robotic pods 102 each incorporate a drive means for propulsion in the horizontal direction along the guide rails 111.

FIG. 1 also shows a plurality of vertical elevator assemblies 131–133 that enable the transfer of the robotic pods 102 in the vertical direction. Multiple vertical elevator assemblies 131–133 are shown in FIG. 1 to exemplify the extensibility and redundancy of the invention. Each of the vertical elevator assemblies 131–133 comprise a set of vertical rails 142 that extend substantially from the top of the frame 101 to the bottom of the frame 101. The vertical rails 142 support a plurality of elevator stations 140, each of which contain short horizontal rail segments 141A, 141B that are identical in cross section to the main horizontal guide rails 121–126. The elevator stations 140 are held in suspension by a drive belt 143 which is made to wrap around a drive pulley attached to a vertical drive motor 113 that is located at the top of each elevator assembly 133. When a vertical displacement is required of any robotic pod 102, the vertical elevator 140 is scheduled to move in alignment to the appropriate level of rows 151–155 to allow transfer of the robotic pod 102 onto the elevator rail section 141A, 141B from the pair of horizontal rails 121–126 that are juxtaposed and abutting to the elevator rails 141A, 141B. Once the robotic pod 102 is located on the elevator station 140, the drive motor 113 is activated to transport the robotic pod 102 to a selected one of rows 151–155 and thence moves on to the pair of horizontal rails 121–126 that correspond to the selected row. Elevator assemblies 131–133 can carry more than one robotic pod 102 at a time by adding elevator platforms 140 to the elevator assemblies 131–133 or by extending the elevator platform length to accommodate multiple robotic pods 102 on a single elevator station 140.

Robotic Pod Architecture

The robotic pods 102 are architected to ride on a pair of horizontally oriented rails as shown in FIGS. 2A, 2B, 3, 4, which show a perspective view of the robotic pod mechanism, a pod assembly incorporating a bar code reader, a side view of two robotic pod mechanisms attached to the guide rail system, and a frontal view of a robotic pod mechanism attached to the guide rail system, respectively.

The robotic pod 102 comprises a robotic pod base assembly that includes a frame 201 to which is attached a printed circuit board 203 that contains electronic circuitry that controls the operation of the robotic pod 102. The robotic pod base assembly also includes the rail propulsion drive motor 204 that operates to drive gears 205A, 205B and the belt 205C that interconnects them, using battery 210 as the power source, with the battery being chargeable via brush type contacts as the robotic pod 102 traverses the rails 121–126. The printed circuit board 203 also includes a wireless transmitter/receiver 202 that enables a controller (not shown) to communicate with each robotic pod 102. The robotic pod base assembly rides on the horizontally oriented rails 121–126 by means of the rail support rollers 206A, 206B, 206C, 206D and final drive rollers 401–404 that guide the robotic pod 102 on the rails.

Figure 2A:
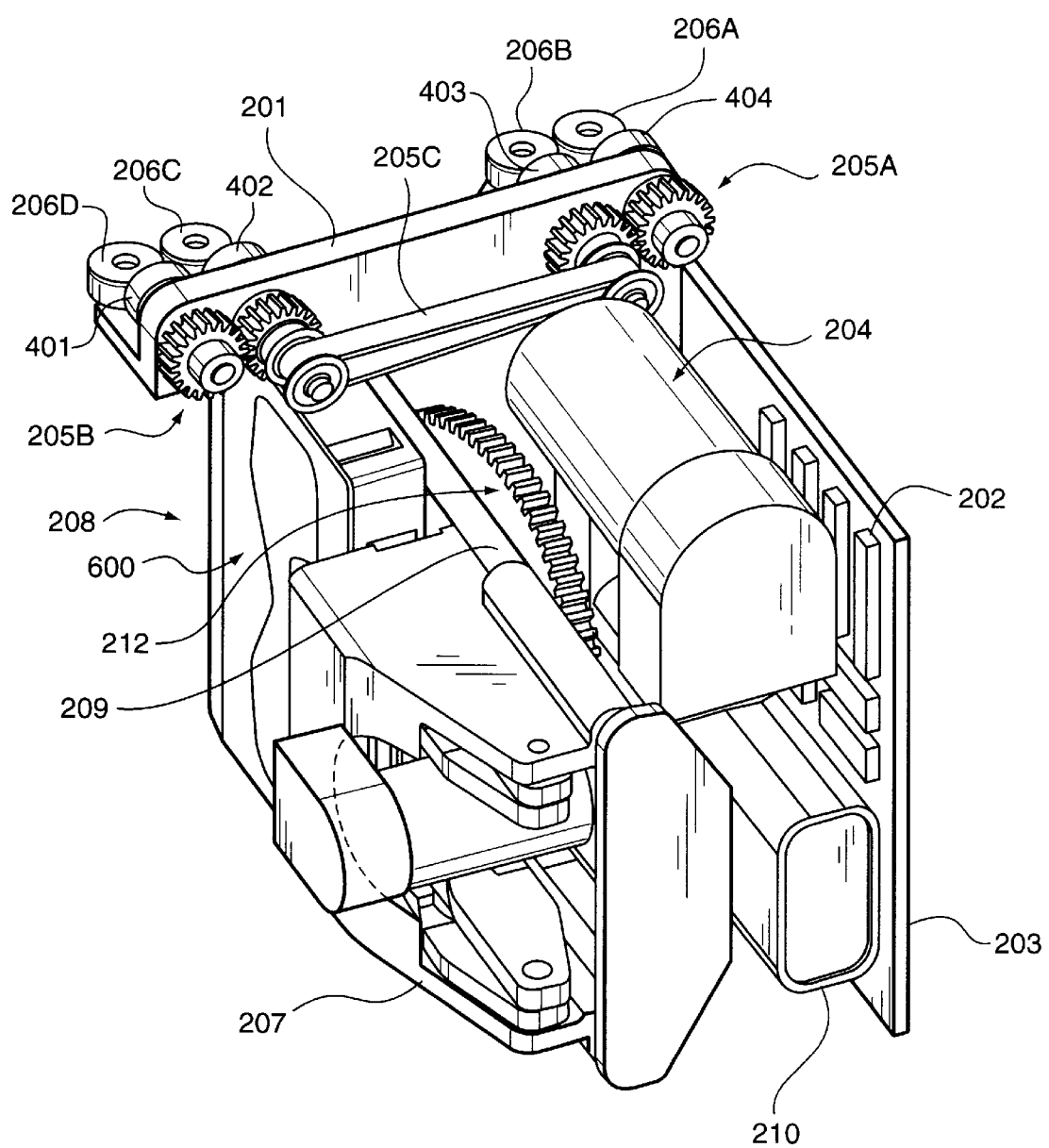
FIGS. 2A, 2B show a perspective view of the robotic pod mechanism of the embodiment of FIG. 1 and a pod assembly incorporating a bar code reader, respectively.
Figure 2B:
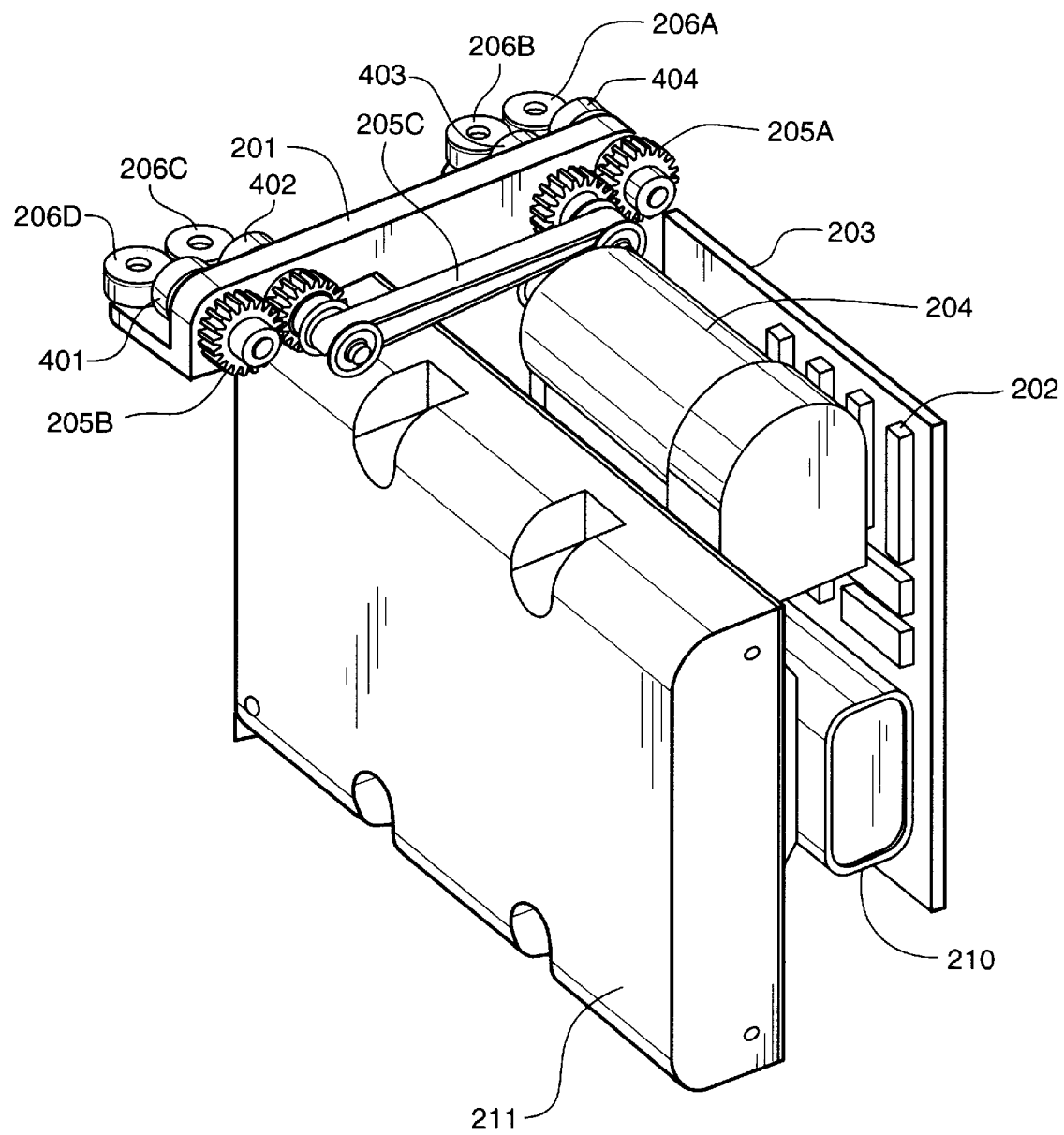

The robotic pod base assembly is host to a subassembly of a functional type such as a picker subassembly as shown in FIG. 2A, a bar code sub assembly as shown in FIG. 2B or a maintenance sub assembly (not shown). A detailed view of a robotic pod base assembly that is equipped with a picker subassembly is shown in FIG. 2A. The picker subassembly comprises a media cartridge gripper assembly 207 that is mounted on a pair of reach out rails 209. A media cartridge reach out drive mechanism 208 is operable to transport the gripper assembly 207 along the reach out rails 209 to a position proximate a selected media cartridge 105 to grasp the cartridge in well known gripper fashion, as described in further detail below. An alternative embodiment of a robotic pod 102 is shown in FIG. 2B wherein the robotic pod base assembly is used to carry a bar code reader apparatus 211 instead of a media cartridge picker mechanism.

Robotic Pod Attachment to the Rail System

Figure 3:
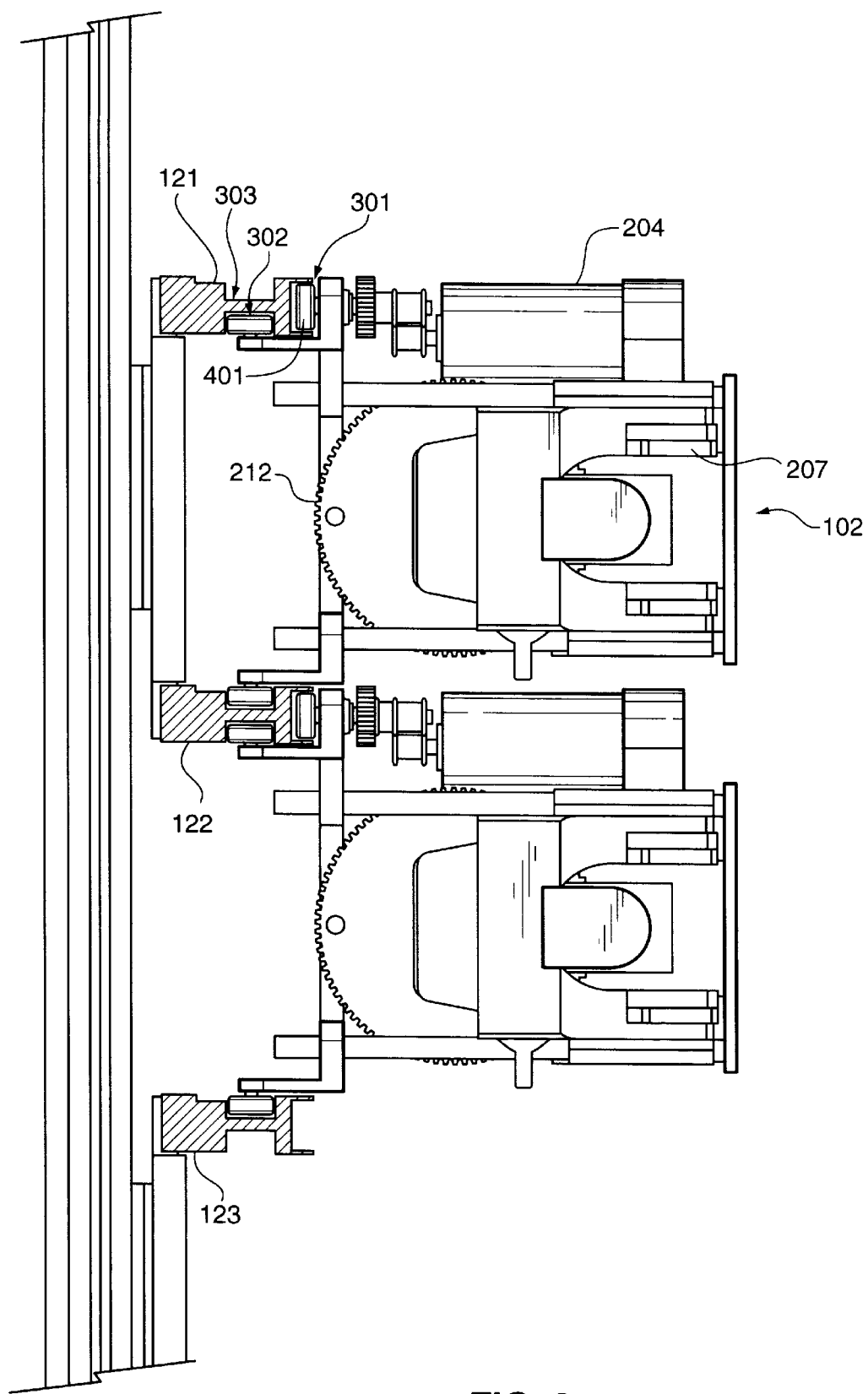
FIG. 3 shows a side view of two robotic pod mechanisms attached to the guide rail system.
Figure 4:
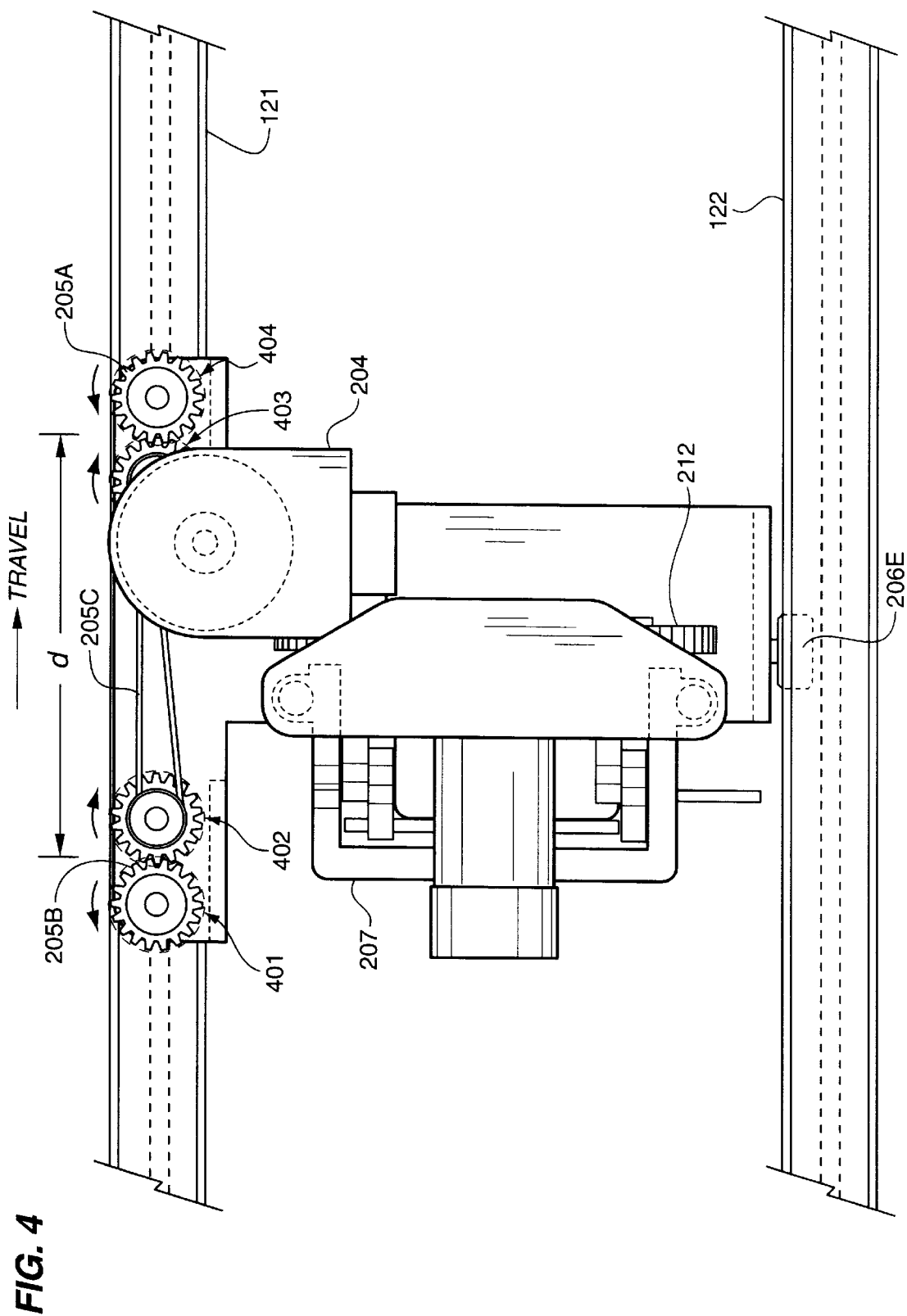
FIG. 4 shows a frontal view of a robotic pod mechanism attached to the guide rail system.

The attachment of the robotic pod 102 to the rail structure is detailed in a side view FIG. 3 and front view in FIG. 4. In FIG. 3 the rail profile is detailed to show a series of roller containment grooves 301, 302 and 303. The grooves 301, 302 and 303 are located strategically to provide for two robotic pods traveling in opposing directions to pass very close to each other on the same rail 122. The final drive rollers 401–404 are oriented with a horizontal axis to take advantage of the mass of the robotic pod assembly to provide a friction force between rail and wheel. A substantially light robotic pod or extreme robotic pod acceleration requires the final drive rollers be of the sprocket type and the guide rail would then be made with mating rack type engagement teeth. The other guide rollers 206A, 206B, 206C, 206D and 206E, oriented with a vertical axis, are necessary to maintain the robotic pod 102 in lateral proximity to the guide rails 121, 122. The high accelerations desired for a robotic pod 102 can be achieved by placing the guide rollers more specifically as shown in FIG. 4. Rollers 401 and 404 are in contact with the upper surface in the groove of the upper guide rail 121, while rollers 402 and 403 are shown to be in contact with the lower surface in the groove of the upper guide rail 121. It is evident that an acceleration in either direction of the robotic pod 102 causes a rotational moment force of the robotic pod 102 on the rails 121, 122, which is counter acted by rollers 401 and 403 when driven to the right, or 402 and 404 when driven to the left. The amount of compressive force between roller and rail is proportional to the acceleration of the robotic pod and can also be increase by minimizing the distance between the roller pairs "d".

Robotic Pod Media Cartridge Picker Assembly

Figure 5A:
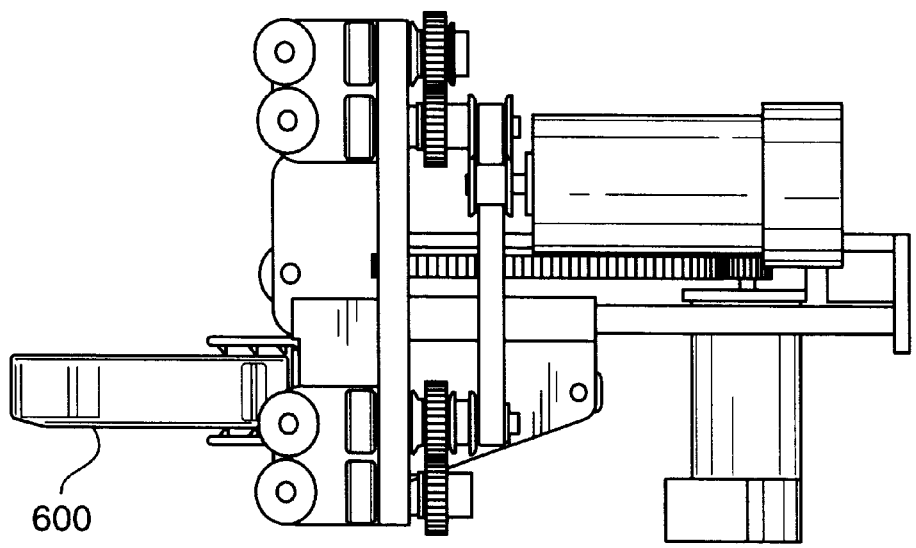
FIG. 5 shows a top view of the robotic pod assembly with the media picking mechanism in extended and retracted positions.
Figure 5B:
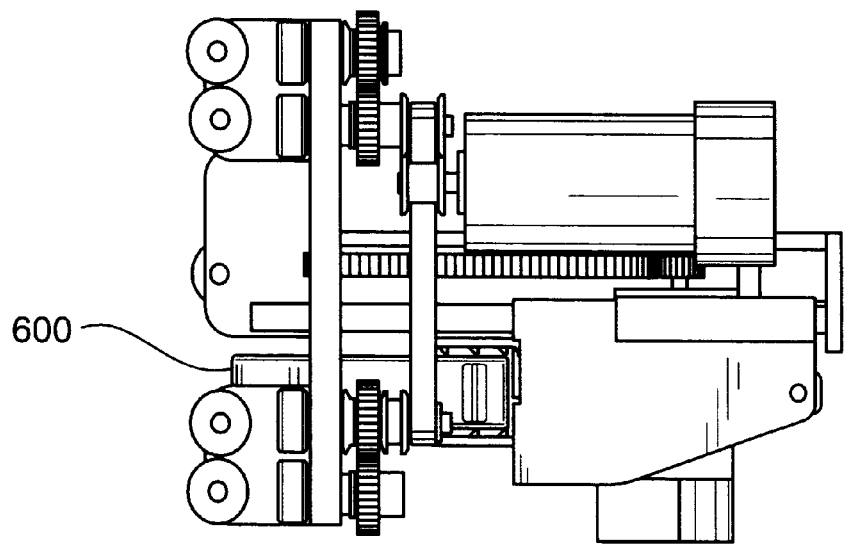
Figure 6:
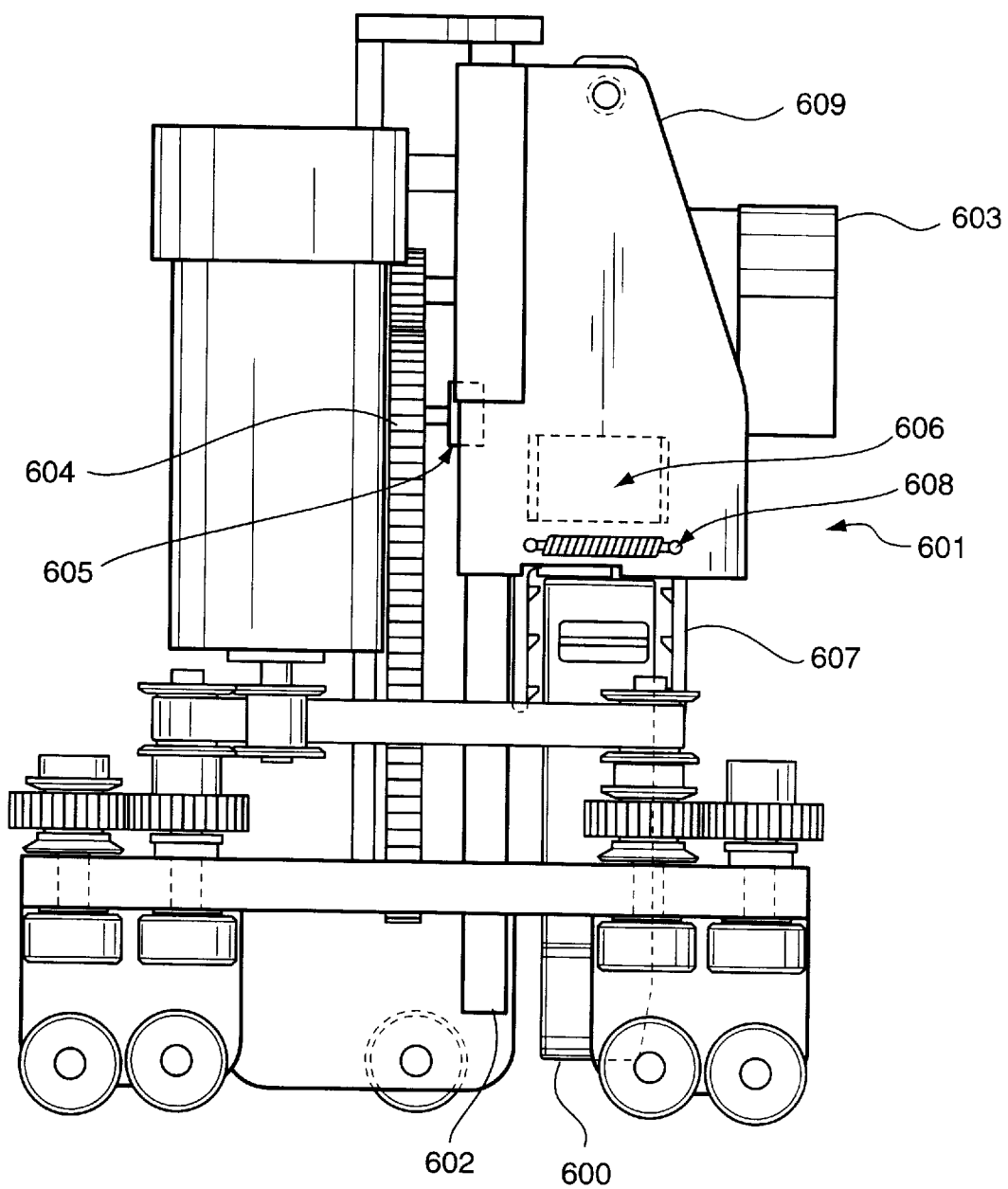
FIG. 6 shows a top view detail of the robotic pod mechanism with description of the media gripping means.

A picker sub assembly mounted to a robotic pod base assembly allows for the picking and placing of media cartridges in media cartridge storage cells, media cartridge players and auxiliary slots such as library loading windows. The picker subassembly shown in FIG. 5 is made to constrain the media cartridge 600 in an onboard position or an extended position. Details of the picker subassembly mechanism are shown in FIG. 6. A picker subassembly has a gripper assembly 601 mounted on linear guide rails 602 and is extensible by means of a reach drive motor 603 and integral reach drive gear/crank 604 operating with a cam follower 605 arranged to impart linear motion to the gripper assembly 601. The gripper mechanism 601 is mounted on a gripper carriage 609 that slides on rails 602. The gripper assembly 601 is actuated by an electromechanical solenoid 606 to open gripper fingers 607 against a spring force from springs 608. An alternate method (not shown) for gripping the media cartridge would be to provide a cam driven mechanical latching device to eliminate the solenoid 606, thereby reducing mass and complexity of the picker subassembly. The operation of a picker equipped robotic pod 102 is illustrated in FIGS. 5A, 5B which illustrate side views of the robotic pod 102 in the media cartridge retracted and extended positions, respectively. Thus, the picker mechanism grasps the media cartridge and, when retracted, pulls the media cartridge into the robotic pod 102 to enable transportation of the selected media cartridge to a designated location by the movement of the robotic pod 102.

Alternative Library System Configurations

Figure 7:
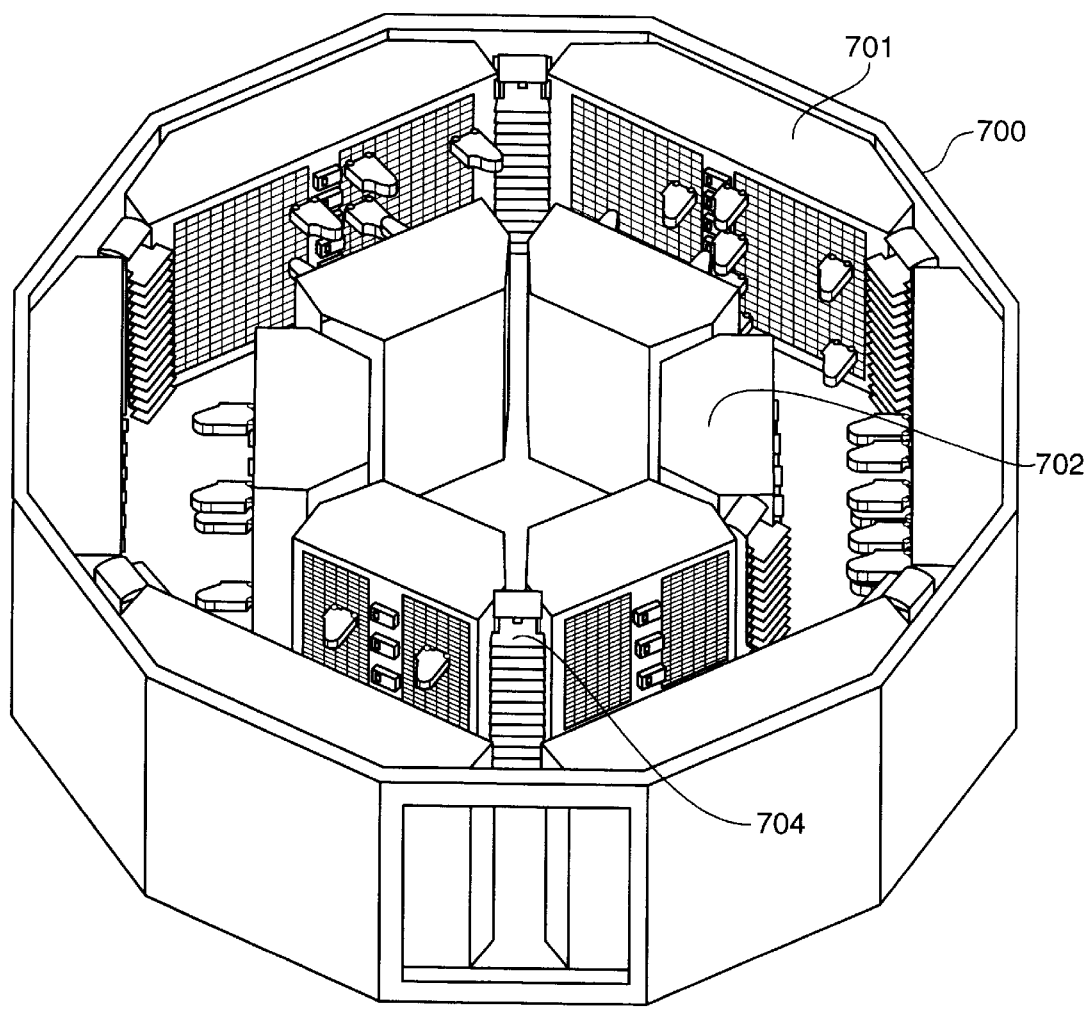
FIG. 7 shows another embodiment of the present apparatus for concurrently manipulating multiple media cartridges by the use of multiple robotic pod mechanisms wherein the integration of media storage cells and rails is arranged into a cylindrical configuration.
Figure 8:
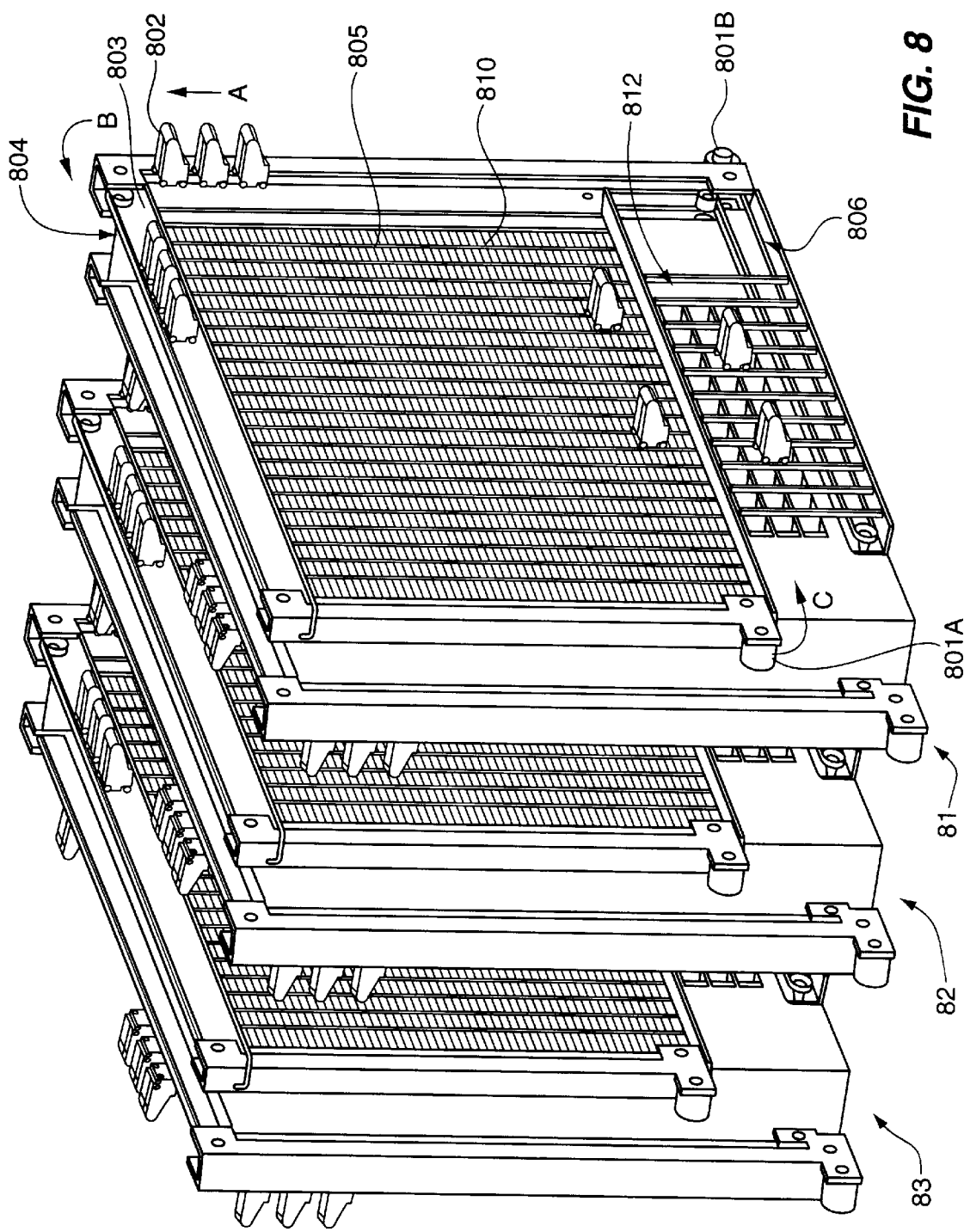
FIG. 8 shows another embodiment of the present apparatus for concurrently manipulating multiple media cartridges by the use of multiple robotic pod mechanisms wherein an alternate propulsion scheme is employed to provide horizontal and vertical robotic pod movement.

The multiple independent robotic pod concept can be extended to include any number of layouts, such as the library system embodiment pictured in FIG. 7. In this diagram, a near circular housing 700 is shown to contain the multiple robotic pod system. The media cartridge storage cells are arranged in a set of two 701, 702 concentric, substantially cylindrical storage arrays. The openings of the media cartridge storage cells are oriented to face the inter-storage array space. The guide rail structure of the storage arrays is arraigned to utilize linear guide pieces with angled elevator assemblies 704, although a curved guide rail could be used. The rail segments of the inner cylindrical array of media cartridge storage cells would be joined to the rail segments of the outer cylindrical array of media cartridge storage cells at critical locations to allow robotic pods to travel between the two cylindrical arrays of media cartridge storage cells. Also, a group of libraries of any type or configuration could be joined by connecting guide rails to allow travel between library housings. The invention of multiple independent robotic pods 81–83 can be embodied in yet another form as shown in FIG. 8. This figure shows a plurality of the library modules 100 as shown in FIG. 1. However, the propulsion scheme for the robotic pods 102 is adaptable to take advantage of an external cable drive motor 801, thereby reducing the mass of the robotic pods 802 by eliminating some of the electromechanical components onboard. In this embodiment, the external cable drive motor 801 is the common propulsive driver for all of the robotic pods 802 in the system. In a design similar to a street car trolley system, the cable drive motor 801 is made to pull the robotic pods 802 along a guide track 803 using a drag cable 804 around the periphery of the frame as shown by arrows A, B, C.

Robotic Pod Drag Cable Gripper

Figure 9:
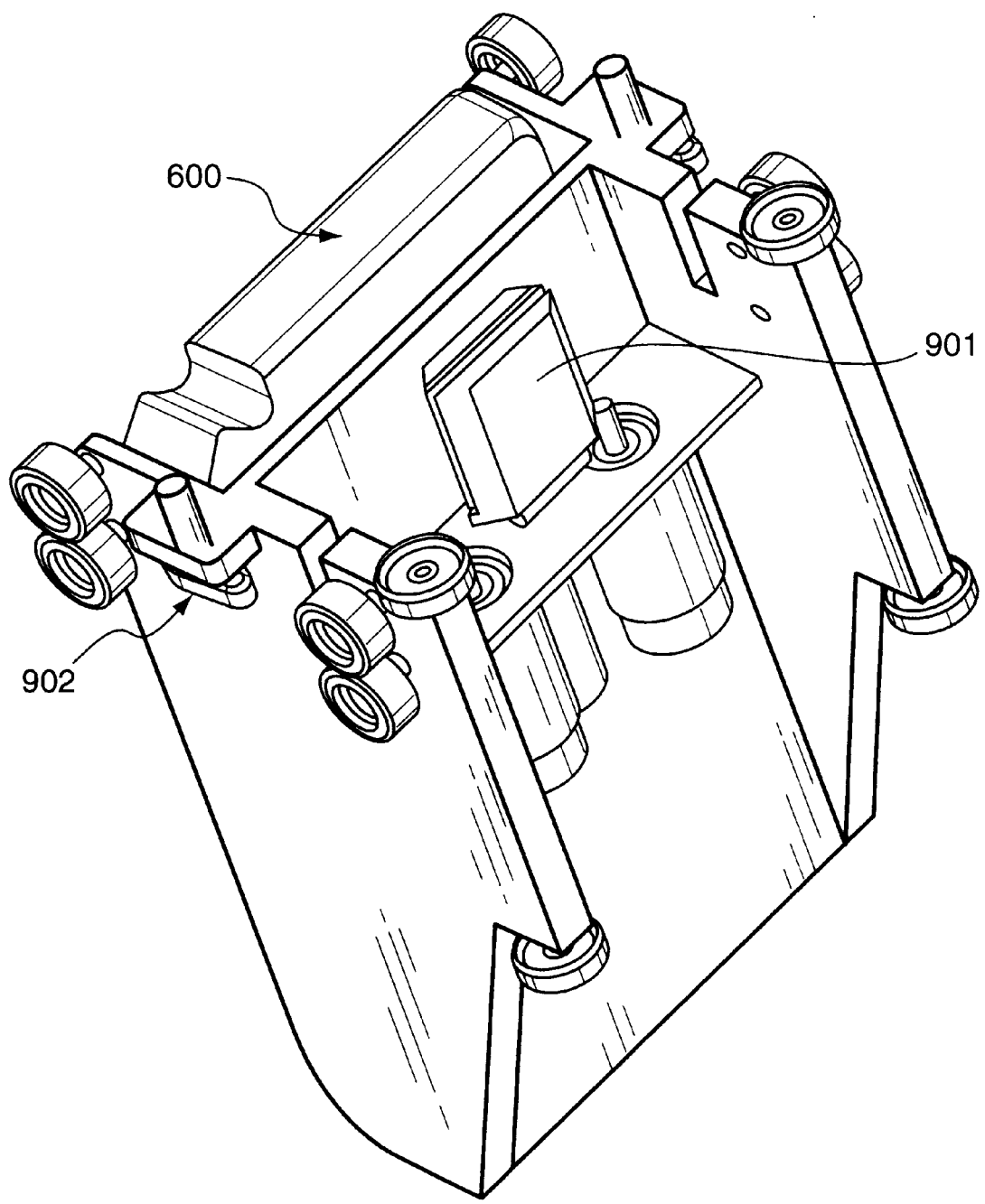
FIG. 9 shows a perspective view of the robotic pod mechanism of FIG. 8.

To cause a robotic pod 802 to translate in either a horizontal or vertical direction, a drag cable gripping device 901, shown in robotic pod detail of FIG. 9, is implemented to allow the remote controlled robotic pod 802 to grab onto the drag cable 804. To stop moving, the cable gripping device 901 releases the drag cable 804. Also, accelerations of the system could be improved if the drag cable 804 could actually start and stop as impelled by the drag cable motor 801. A further innovation shown in FIG. 8 is the array of vertical guide rails 805 that allow the robotic pods 802 to travel in a vertical direction. It is intended that a counter-clockwise driving force from the drag cable 804 would cause robotic pods 802 to move around the perimeter of the wall in a loop, allowing the robotic pods 802 to stop and unlatch themselves from the drag cable 804 at any suitable location. After they have arrived at the predetermined horizontal location, unlatching from the drag cable 804 would cause the robotic pod 802 to fall with gravity along the vertical guide rails 805. In FIG. 9, an electromechanical friction clutch 902 on the robotic pod 802 would then cause a stopping force against the vertical guide rail 805 to bring the robotic pod 802 into alignment with a given media cartridge storage cell 810 or media cartridge player 812. Further vertical motion of the robotic pod 802 would bring it back into relation with the drag cable 804 at the bottom of the array of media cartridge storage cells. An auxiliary drag cable loop 806 is shown to illustrate how the media cartridge players 812 would be integrated into such a system.

Summary

Thus, the library system comprises a two-dimensional array that contains media cartridge storage cells and media cartridge players, with a system of rails to guide robotic pods through all of the locations in the array. The robotic pods contain a moveable carriage that is capable of transporting robotic components, such as media cartridge pickers, bar code reading devices, and other task oriented sub-modules, in the storage library rail system. For example, the robotic pod carriage assemblies can be fitted with maintenance devices, monitoring instruments or cleaning apparatus to give added flexibility to the rail system architecture.

What is claimed:

1. A media library system for the storage and retrieval of a plurality of media, comprising:
    an array comprising a plurality of media storage cells arranged in at least two rows, with said at least two rows stacked in a vertical direction; and
    a rail mechanism comprising a set of guide rails that enable access to each of said plurality of media storage cells, a guide rail of the set of guide rails arranged horizontally along a side of each of said rows, to support at least one robot, wherein each of said guide rails comprises at least one containment groove formed in a side of said guide rail to receive rollers of said at least one robot.

2. The media library system of claim 1, wherein said at least one robot comprises a plurality of robots, each operable to move on said rail mechanism independent of others of said plurality of robots, to access said plurality of media storage cells.

3. The media library system of claim 1, wherein said array further comprises:
    at least one media player, responsive to receipt of a one of said plurality of media, for reading/writing data on said media.

4. The media library system of claim 1, wherein each of said robots comprises:
    a media processing mechanism; and
    a robotic pod base mechanism for supporting said media processing mechanism and transporting said media processing mechanism along said rail mechanism to a selected one of said media storage cells.

5. The media library system of claim 4, wherein said robotic pod base mechanism comprises:
   at least one drive roller for propelling each of said robots along said rail mechanism;
   a drive motor mechanism to drive said at least one drive roller; and
   a wireless controller that activates said drive motor mechanism in response to commands received in a wireless mode of transmission.

6. The media library system of claim 5, wherein said robotic pod base mechanism comprises:
   a battery that provides a source of power for said drive motor mechanism.

7. The media library system of claim 4, wherein said media processing mechanism comprises:
   a media picker, operable to remove a media from a selected one of said plurality of media storage cells.

8. The media library system of claim 4, wherein said media processing means comprises:
   a media scanner, operable to read media label data from a selected one of said plurality of media.

9. The media library system of claim 1, further comprising:
   at least one elevator mechanism to transport said at least one robot in a vertical direction from row to row.

10. The media library system of claim 9, wherein said at least one elevator mechanism comprises:
    a vertically oriented set of guide rails, located proximate an end of said set of guide rails;
    an elevator platform mechanism operable to move on said vertically oriented set of guide rails for receiving said at least one robot; and
    an elevator drive mechanism to transport said elevator platform mechanism in a vertical direction from a first of said rows to a second selected one of said rows.

11. The media library system of claim 10, wherein said elevator platform mechanism comprises:
    a horizontally oriented set of guide rail segments positioned to align with two adjacent ones of said set of rail guides that are located at a top and a bottom of said selected one of said rows.

12. The media library system of claim 1, wherein the rail mechanism is incrementally expandable to access additional media storage cells.

13. The media library system of claim 1, wherein the at least one robot is electrically coupled to the rail mechanism via brush type contacts.

14. A media library system for the storage and retrieval of a plurality of media, comprising:
    an array comprising a plurality of media storage cells arranged in at least two rows, with said at least two rows stacked in a vertical direction; and
    a rail mechanism comprising a set of guide rails that enable access to each of said plurality of media storage cells, a guide rail of the set of guide rails arranged horizontally along a side of each of said rows, to support at least one robot, wherein the at least one robot is transportable along the rail mechanism by a rack and pinion type drive gear interface.

15. A media library system for the storage and retrieval of a plurality of media using a plurality of robots, comprising:
    an array comprising a plurality of media storage cells arranged in at least two rows, with said at least two rows stacked in a vertical direction; and
    a rail mechanism comprising a set of guide rails that enable access to each of said plurality of media storage cells, a guide rail of the set of guide rails arranged horizontally along a side of each of said rows, to support at least one robot, wherein at least one guide rail comprises a plurality of containment groves to simultaneously receive rollers from more than one of the plurality of robots.

16. The media library system of claim 15, wherein an upper robot is coupled to at least one of the plurality of containment grooves, and a lower robot is coupled to another of the plurality of containment grooves such that both the upper and lower robot can move along the at least one guide rail without interfering with one another.

17. A media library system for the storage and retrieval of a plurality of media, comprising:
    an array comprising a plurality of media storage cells arranged in at least two rows, with said at least two rows stacked in a vertical direction; and
    a rail mechanism comprising a set of guide rails that enable access to each of said plurality of media storage cells, a guide rail of the set of guide rails arranged horizontally along a side of each of said rows, to support at least one robot; and
    at least one elevator mechanism to transport said at least one robot in a vertical direction through said array.

18. A media library system for the storage and retrieval of a plurality of media, comprising:
    an array comprising a plurality of media storage cells arranged in at least two columns, with said at least two columns being stacked in a horizontal direction; and
    a rail mechanism comprising a set of guide rails that enable access to each of said plurality of media storage cells, at least one guide rail arranged vertically along a side of each of said columns, to support at least one robot, wherein each of said guide rails comprises at least one containment groove formed in a side of said guide rail to receive rollers on said at least one robot.

19. The media library system of claim 18, wherein said at least one robot comprises a plurality of robots, each operable to move on said rail mechanism independent of others of said plurality of robots, to access said plurality of media storage cells.

20. The media library system of claim 18, wherein each of said robots comprises:
    a media processing mechanism; and
    a robotic pod base mechanism for supporting said media processing mechanism and transporting said medial processing mechanism along said rail mechanism to a selected one of said media storage cells.

21. The media library system of claim 20, wherein said robotic pod base mechanism comprises:
    at least one drive roller for propelling each of said robots along said rail mechanism;
    a cable gripper for selectively grabbing a cable that moves horizontally along a top of said at least two columns of media storage cells; and
    a wireless controller that activates said drive motor mechanism in response to commands received in a wireless mode of transmission.

22. The media library system of claim 21, wherein said robotic pod base mechanism further comprises:
    a vertical guide roller brake for controlling movement of said robotic mechanism in a vertical direction from row to row.

23. The media library system of claim 22, wherein said robotic pod base mechanism comprises:
  a battery that provides a source of power for said cable gripper means.

24. The media library system of claim 20, wherein said media processing mechanism comprises:
  a media picker mechanism, operable to remove a media from a selected one of said plurality of media storage cells.

25. The media library system of claim 21, wherein said media processing mechanism comprises:
  a media scanner mechanism, operable to read media label data from a selected one of said plurality of media.

26. A media library system for the storage and retrieval of a plurality of media using a plurality of robots, comprising:
  an array comprising a plurality of media storage cells arranged in at least two columns, with said at least two columns being stacked in a horizontal direction; and
  a rail mechanism comprising a set of guide rails that enable access to each of said plurality of media storage cells, at least one guide rail arranged vertically along a side of each of said columns, to support at least one robot, wherein at least one guide rail comprises a plurality of containment groves to simultaneously receive rollers from more than one of the plurality of robots.

27. The media library system of claim 26, wherein an upper robot is coupled to at least one of the plurality of containment grooves, and a lower robot is coupled to another of the plurality of containment grooves such that both the upper and lower robot can move along the at least one guide rail without interfering with one another.

28. A media library system for the storage and retrieval of a plurality of media, comprising:
  an array comprising a plurality of media arranged in at least two rows stacked in a vertical direction; and
  a rail mechanism comprising a set of guide rails that enable access to each of said plurality of media, one guide rail of the set of guide rails arranged horizontally along a side of a corresponding one of said rows, to at least partially support at least one robot, and a second guide rail of the set of guide rails arranged horizontally along a side of another one of said rows to at least partially support another robot, wherein the second rail guide comprises a plurality of containment groves to receive rollers from the at least one robot and the another robot.

29. The media library system of claim 28, wherein both robot and the another robot can move along the second guide rail without interfering with one another.

30. The media library system of claim 28, wherein the at least one robot is transportable along the one guide rail by a rack and pinion type drive gear interface.

31. The media library system of claim 28, wherein said array further comprises:
  at least one media player, responsive to receipt of a one of said plurality of media, for reading/writing data on said media.

32. A media library system for the storage and retrieval of a plurality of media, comprising:
  an array comprising a plurality of media cells arranged in at least two rows stacked in a vertical direction;
  a rail mechanism comprising a set of guide rails that enable robot access to each of said plurality of media cells, one guide rail of the set of guide rails arranged horizontally along a side of a corresponding one of said rows and another guide rail of the set of guide rails arranged horizontally along a side of another of said rows; and
  a first robot attached to the one guide rail and a second robot attached to the another guide rail, wherein the first robot is also attached to the another guide rail.

33. The media library system of claim 32, wherein the another rail guide comprises a plurality of containment groves to receive rollers from the first robot and the second robot.

34. The media library system of claim 33, wherein both the first robot and the second robot can move along the another rail guide without interfering with one another.

35. The media library system of claim 32, wherein the first robot is transportable along the one guide rail by a rack and pinion type drive gear interface.

36. The media library system of claim 32, wherein said array further comprises:
  at least one media player, responsive to receipt of a one of said plurality of media, for reading/writing data on said media.

37. A media library system for the storage and retrieval of a plurality of media, comprising:
  an array comprising a plurality of media arranged in at least two rows;
  a rail mechanism comprising a set of guide rails that enable access to each of said plurality of media, one guide rail of the set of guide rails arranged horizontally along a side of each of said rows; and
  a robot attached to (i) the guide rail associated with a first row of the at least two rows and (ii) the guide rail associated with a second row of the at least two rows adjacent the first row.

38. The media library system of claim 37, further comprising a second robot attached to the guide rail associated with the second row.

39. The media library system of claim 38, wherein the guide rail associated with the second row comprises a plurality of containment groves to simultaneously receive rollers from the robot and the second robot.

40. The media library system of claim 39, wherein both the robot and the second robot can move along the guide rail associated with the second row without interfering with one another.

41. The media library system of claim 37, wherein the robot is transportable along the guide rail associated with the first row by a rack and pinion type drive gear interface.

42. The media library system of claim 41, wherein the robot is transportable along the guide rail associated with the second row by a guide roller.

43. A media library system for the storage and retrieval of a plurality of media, comprising:
  an array comprising a plurality of media cells arranged in at least two rows;
  a rail mechanism comprising a set of guide rails that enable access to each of said plurality of media cells, one guide rail of the set of guide rails arranged horizontally along at least one side of a corresponding one of said rows, to support at least one robot, wherein the at least one robot comprises:
    a media processing mechanism; and
    a robotic pod base mechanism for supporting said media processing mechanism and transporting said media processing mechanism along a guide rail of the set of guide rails to a selected one of said media, wherein each of said robotic pod base mechanism comprises:

at least one drive roller for propelling said at least one robot and said second robot, respectively, along said shareable guide rail;
a drive motor mechanism to drive said at least one drive roller; and
a wireless controller that activates said drive motor mechanism in response to commands received in a wireless mode of transmission.

44. The media library system of claim 43, wherein said array further comprises:
at least one media player, responsive to receipt of a one of said plurality of media, for reading/writing data on said media.

45. The media library system of claim 43, wherein said guide rail comprises:
at least one containment groove formed in a side of said guide rail to receive rollers of said at least one robot.

46. The media library system of claim 43, further comprising a shareable guide rail located between two rows of the at least two rows, said shareable guide rail comprising a plurality of containment groves to receive rollers from said at least one robot and a second robot.

47. The media library system of claim 46, wherein the at least one robot is coupled to at least one of the plurality of containment grooves, and the second robot is coupled to another of the plurality of containment grooves such that both the robot and the second robot can move along the shareable guide rail without interfering with one another.

48. The media library system of claim 43, wherein said robotic pod base mechanism comprises:
a battery that provides a source of power for said drive motor mechanism.

49. The media library system of claim 43, wherein said media processing mechanism comprises:
a media picker, operable to pick a media from a selected one of said plurality of media.

50. The media library system of claim 43, further comprising:
at least one elevator mechanism to transporting said at least one robot in a vertical direction through said array.

51. The media library system of claim 43, further comprising:
at least one elevator mechanism to transport said at least one robot in a vertical direction from row to row.

52. The media library system of claim 51, wherein said at least one elevator mechanism comprises:
a vertically oriented set of guide rails, located proximate an end of said set of guide rails;
an elevator platform mechanism operable to move on said vertically oriented set of guide rails for receiving said at least one robot; and
an elevator drive mechanism to transport said elevator platform mechanism in a vertical direction from a first of said rows to a second selected one of said rows.

53. The media library system of claim 52, wherein said elevator platform mechanism comprises:
a horizontally oriented set of guide rail segments positioned to align with two adjacent ones of said set of rail guides that are located at a top and a bottom of said selected one of said rows.

54. The media library system of claim 43, wherein said at least one robot is transportable along the one guide rail by a rack and pinion type drive gear interface.

55. A media library system for the storage and retrieval of a plurality of media, comprising:

an array comprising a plurality of media cells arranged in at least two rows;
a rail mechanism comprising a set of guide rails that enable access to each of said plurality of media cells, one guide rail of the set of guide rails arranged horizontally along at least one side of a corresponding one of said rows, to support at least one robot, wherein the at least one robot comprises:
a media processing mechanism, comprising a media scanner, operable to read media label data from a selected one of said plurality of media; and
a robotic pod base mechanism for supporting said media processing mechanism and transporting said media processing mechanism along a guide rail of the set of guide rails to a selected one of said media.

56. A media library system for the storage and retrieval of a plurality of media, comprising:
an array comprising a plurality of media cells arranged in at least two rows; and
a rail mechanism comprising a set of guide rails that enable access to each of said plurality of media cells by a plurality of robots, said rail mechanism allowing a robot to access any of media cells in one of the at least two rows while simultaneously allowing another robot to access any of the media cells in another of the at least two rows, wherein at least one of the guide rails of the set of guide rails comprises at least one support structure to at least partially support said robot and said another robot.

57. The media library system of claim 56, wherein said array further comprises:
at least one media player, responsive to receipt of a one of said plurality of media, for reading/writing data on said media.

58. The media library system of claim 56, wherein at least one of the guide rails of the set of guide rails comprises:
a plurality of containment groves to simultaneously receive rollers from said robot and said another robot.

59. The media library system of claim 58, wherein the robot is coupled to at least one of the plurality of containment grooves, and the another robot is coupled to another of the plurality of containment grooves such that both the robot and the another robot can move along the shareable guide rail without interfering with one another.

60. The media library system of claim 56, wherein each of said robot and said another robot comprises:
a media processing mechanism; and
a robotic pod base mechanism for supporting said media processing mechanism and transporting said media processing mechanism along said rail mechanism to a selected one of said media.

61. The media library system of claim 60, wherein each of said robotic pod base mechanism comprises:
at least one drive roller for propelling said robot and said second robot, respectively, along said rail mechanism;
a drive motor mechanism to drive said at least one drive roller; and
a wireless controller that activates said drive motor mechanism in response to commands received in a wireless mode of transmission.

62. The media library system of claim 61, wherein said robotic pod base mechanism comprises:
a battery that provides a source of power for said drive motor mechanism.

63. The media library system of claim 60, wherein said media processing mechanism comprises:

a media picker, operable to pick a media from a selected one of said plurality of media.

64. The media library system of claim 60, wherein said media processing means comprises:
   a media scanner, operable to read media label data from a selected one of said plurality of media.

65. The media library system of claim 56, further comprising:
   at least one elevator mechanism to transporting said robot in a vertical direction through said array.

66. The media library system of claim 56, further comprising:
   at least one elevator mechanism to transport said robot in a vertical direction from row to row.

67. The media library system of claim 66, wherein said at least one elevator mechanism comprises:
   a vertically oriented set of guide rails, located proximate an end of said set of guide rails;
   an elevator platform mechanism operable to move on said vertically oriented set of guide rails for receiving said at least one robot; and
   an elevator drive mechanism to transport said elevator platform mechanism in a vertical direction from a first of said rows to a second selected one of said rows.

68. The media library system of claim 67, wherein said elevator platform mechanism comprises:
   a horizontally oriented set of guide rail segments positioned to align with two adjacent ones of said set of rail guides that are located at a top and a bottom of said selected one of said rows.

69. The media library system of claim 56, wherein the robot is transportable along the rail mechanism by a rack and pinion type drive gear interface.

70. A method for operating a media library system for the storage and retrieval of a plurality of media, said media library system comprising a plurality of media arranged in at least two rows and a rail mechanism comprising guide rails that enable access to each of said plurality of media by at least one robot, comprising the steps of:
   moving the at least one robot along a first fixed rail portion of the guide rails to access media in one row of the at least two rows;
   moving the at least one robot from the first fixed rail portion to a moveable rail portion of the guide rails;
   moving the moveable rail portion to align with a second fixed rail portion of the guide rails; and
   moving the at least one robot from the moveable rail portion to the second fixed rail portion to access media in another row of the at least two rows.

71. A modular library system for the storage and retrieval of a plurality of media, comprising:
   an array comprising a plurality of media storage cells arranged in at least two rows, with said at least two rows stacked in a vertical direction, wherein the array comprises an inner array and an outer array, and the rail mechanism comprises inner array rail segments and outer array rail segments; and
   a rail mechanism comprising a set of guide rails that enable robotic access to each of said plurality of media storage cells, the rail mechanism being incrementally expandable to access additional media storage cells.

72. The modular library system of claim 71, wherein at least one of the inner array rail segments is mechanically coupled to at least one of the outer array rail segments to allow at least one robot to travel between the inner and outer arrays.

73. The modular library system of claim 71, further comprising a plurality of robots, each operable to move on the rail mechanism independent of others of said plurality of robots, to access said plurality of media storage locations.

74. The modular library system of claim 73, wherein the plurality of robots are electrically coupled to the rail mechanism via brush type contacts.

75. The modular library system of claim 73, wherein said plurality of robots are transportable along the rail mechanism by a rack and pinion type drive gear interface.

76. A modular library system for the storage and retrieval of a plurality of media, comprising:
   an array comprising a plurality of media storage cells arranged in at least two rows, with said at least two rows stacked in a vertical direction; and
   a rail mechanism comprising a set of guide rails that enable robotic access to each of said plurality of media storage cells, the rail mechanism being incrementally expandable to access additional media storage cells, wherein the rail mechanism comprises linear guide rails and curved guide rails.

77. A media library system for the storage and retrieval of a plurality of media, comprising:
   an array comprising a plurality of media arranged in a plurality of rows; and
   a shareable guide rail, positioned between two of the plurality of rows, that at least partially supports a robot accessing an upper row of the two rows and a second robot accessing a lower row of the two rows.

78. The media library system of claim 77, wherein said array further comprises:
   at least one media player, responsive to receipt of a one of said plurality of media, for reading/writing data on said media.

79. The media library system of claim 77, wherein said shareable guide rail comprises:
   at least one containment groove formed in a side of said guide rail to receive rollers of said robot and said second robot.

80. The media library system of claim 77, wherein said shareable guide rail comprises a plurality of containment groves to receive rollers from said robot and said second robot.

81. The media library system of claim 80, wherein the robot is coupled to at least one of the plurality of containment grooves, and the second robot is coupled to another of the plurality of containment grooves such that both the robot and the second robot can move along the shareable guide rail without interfering with one another.

82. The media library system of claim 81, wherein said media processing means comprises:
   a media scanner, operable to read media label data from a selected one of said plurality of media.

83. The media library system of claim 77, wherein each of said robot and said second robot comprise:
   a media processing mechanism; and
   a robotic pod base mechanism for supporting said media processing mechanism and transporting said media processing mechanism along said shareable guide rail to a selected one of said media.

84. The media library system of claim 83, wherein each of said robotic pod base mechanism comprises:
   at least one drive roller for propelling said robot and said second robot, respectively, along said shareable guide rail;

a drive motor mechanism to drive said at least one drive roller; and a wireless controller that activates said drive motor mechanism in response to commands received in a wireless mode of transmission.

85. The media library system of claim 84, wherein said robotic pod base mechanism comprises:

a battery that provides a source of power for said drive motor mechanism.

86. The media library system of claim 83, wherein said media processing mechanism comprises:

a media picker, operable to pick a media from a selected one of said plurality of media.

87. The media library system of claim 77, further comprising:

at least one elevator mechanism to transporting said at least one robot in a vertical direction through said array.

88. The media library system of claim 77, further comprising:

at least one elevator mechanism to transport said at least one robot in a vertical direction from row to row.

89. The media library system of claim 88, wherein said at least one elevator mechanism comprises:

a vertically oriented set of guide rails, located proximate an end of said set of guide rails;

an elevator platform mechanism operable to move on said vertically oriented set of guide rails for receiving said at least one robot; and an elevator drive mechanism to transport said elevator platform mechanism in a vertical direction from a first of said rows to a second selected one of said rows.

90. The media library system of claim 89, wherein said elevator platform mechanism comprises:

a horizontally oriented set of guide rail segments positioned to align with two adjacent ones of said set of rail guides that are located at a top and a bottom of said selected one of said rows.

91. The modular library system of claim 77, wherein at least one of the robot and the second robot is transportable along the shareable guide rail by a rack and pinion type drive gear interface.

* * * * *